(12) United States Patent
Kim et al.

(10) Patent No.: US 9,559,341 B2
(45) Date of Patent: Jan. 31, 2017

(54) RECHARGEABLE BATTERY HAVING A VENT UNIT AT A JOINT IN A CAP PLATE

(71) Applicants: SAMSUNG SDI CO., LTD., Yongin-si, Gyeonggi-do (KR); ROBERT BOSCH GMBH, Stuttgart (DE)

(72) Inventors: Duk-Jung Kim, Yongin-si (KR); Yong-Sam Kim, Yongin-si (KR); Min-Hyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 169 days.

(21) Appl. No.: 14/081,670

(22) Filed: Nov. 15, 2013

(65) Prior Publication Data
US 2015/0024241 A1 Jan. 22, 2015

(30) Foreign Application Priority Data

Jul. 16, 2013 (KR) ........................ 10-2013-0083781

(51) Int. Cl.
| | |
|---|---|
| *H01M 2/02* | (2006.01) |
| *H01M 2/04* | (2006.01) |
| *H01M 2/06* | (2006.01) |
| *H01M 2/12* | (2006.01) |
| *H01M 2/30* | (2006.01) |

(52) U.S. Cl.
CPC ......... *H01M 2/0404* (2013.01); *H01M 2/0426* (2013.01); *H01M 2/1241* (2013.01)

(58) Field of Classification Search
CPC H01M 2/1235; H01M 2/0404; H01M 2/1241; H01M 2/0426

USPC ............................ 429/56, 163, 175, 176, 178
See application file for complete search history.

(56) References Cited

U.S. PATENT DOCUMENTS

| | | | |
|---|---|---|---|
| 4,965,149 A | 10/1990 | Ashihara et al. | |
| 7,989,100 B2 | 8/2011 | Matsumoto et al. | |
| 2012/0114987 A1* | 5/2012 | Kogure | .............. H01M 2/06 429/56 |
| 2012/0189884 A1* | 7/2012 | Guen | ............. H01M 2/0473 429/82 |
| 2012/0214037 A1 | 8/2012 | Hara et al. | |

FOREIGN PATENT DOCUMENTS

| | | |
|---|---|---|
| JP | 2011-96539 A | 5/2011 |
| KR | 1992-0004294 B1 | 6/1992 |
| KR | 10-2001-0038812 A | 5/2001 |
| KR | 10-2007-0030686 A | 3/2007 |

OTHER PUBLICATIONS

KIPO Office Action dated Jul. 21, 2016, for corresponding Korean Patent Application No. 10-2013-0083781 (6 pages).

* cited by examiner

*Primary Examiner* — Sean P Cullen
(74) *Attorney, Agent, or Firm* — Lewis Roca Rothgerber Christie LLP (57) ABSTRACT

A rechargeable battery includes an electrode assembly including a first electrode, a second electrode, and a separator between the first electrode and the second electrode. The rechargeable battery also includes a case accommodating the electrode assembly. The rechargeable battery further includes a cap plate including a first plate and a second plate coupled to the first plate along a joint. The cap plate is coupled to an opening of the case. The rechargeable battery also includes a vent unit at the joint where the first plate of the cap plate is coupled to the second plate.

11 Claims, 6 Drawing Sheets

RECHARGEABLE BATTERY HAVING A VENT UNIT AT A JOINT IN A CAP PLATE

CROSS-REFERENCE TO RELATED APPLICATION

This application claims priority to and the benefit of Korean Patent Application No. 10-2013-0083781 filed in the Korean Intellectual Property Office on Jul. 16, 2013, the entire contents of which are incorporated herein by reference.

BACKGROUND

1. Field

The described technology relates generally to a rechargeable battery.

2. Description of the Related Art

Unlike a primary battery, a rechargeable battery can be repeatedly recharged and discharged. A small-capacity rechargeable battery is used for small portable electronic devices such as mobile phones, notebook computers, camcorders, and the like, while a large-capacity rechargeable battery is used as a motor-driving power source, such as in a hybrid vehicle, or as a large-capacity power storage device.

High power rechargeable batteries using a non-aqueous electrolyte with high energy density have been developed. These high power rechargeable batteries may be formed into a large capacity rechargeable battery by coupling a plurality of rechargeable batteries in series. Such large capacity rechargeable batteries may be used as a power source for driving a motor of a device, for example, an electric vehicle requiring high electric power. The rechargeable battery can be cylindrical or prismatic.

When a rechargeable battery is charged or discharged with a current that exceeds the current rating of the battery, the rechargeable battery may explode or ignite.

Accordingly, a protective circuit module and a vent member are conventionally installed in the rechargeable battery in order to prevent explosion or ignition of the rechargeable battery that may be caused by drawing or supplying excessive current from or to the rechargeable battery.

The vent member is configured to rupture or break and thereby discharge the gas generated inside the rechargeable battery to the outside of the rechargeable battery when the internal pressure of the rechargeable battery exceeds a predetermined pressure.

Conventional rechargeable batteries include a cover coupled to an opening of the battery case, a vent hole formed in the cover, and a vent member welded in the vent hole.

Accordingly, the process of manufacturing a conventional rechargeable battery having a vent is complicated because the vent hole is formed in the cover and the vent member is welded in the vent hole so as to install the vent member in the rechargeable battery The above information disclosed in this Background section is provided only to aid in understanding the background of the described technology and therefore it may contain information that does not form a part of the prior art.

SUMMARY

In one embodiment, the rechargeable battery of the present invention includes an electrode assembly including a first electrode, a second electrode, and a separator between the first electrode and the second electrode. The rechargeable battery also includes a case accommodating the electrode assembly. The rechargeable battery further includes a cap plate including a first plate and a second plate coupled to the first plate along a joint. The cap plate is coupled to an opening of the case. The rechargeable battery also includes a vent unit formed at the joint where the first plate of the cap plate is coupled to the second plate.

The vent unit may include a notch at at least one of the first plate or the second plate. The vent unit may further include a groove at at least one of the first plate or the second plate, and the notch is in the groove. The groove may include a first groove in the first plate and a second groove in the second plate. The first groove is coupled to the second groove. The notch may include a first notch in the first groove and a second notch in the second groove. The first notch is coupled to the second notch. In one embodiment, the vent unit is formed on a first side of the cap plate facing the electrode assembly.

The groove may be in the first body plate. The vent unit may include a protrusion protruding from the second plate, and the notch may be in the protrusion. The groove may include an inset portion into which the protrusion is inserted, and an opening exposing the notch.

The first plate may include a first plate body including an insulation material, a connection unit coupled to the first plate body and the opening of the case, a first terminal coupled to a first side of the first plate body, and a bottom insulator coupled to a second side of the first plate body facing the electrode assembly. The first plate body, the connection unit, the first terminal, and the bottom insulator may be molded and integrally formed. The connection unit may be a same metal material as the second plate, and the connection unit may be coupled to the second plate through welding.

According to one or more embodiments of the present disclosure, the vent unit is formed as part of cap plate to simplify the process for forming the vent unit, which simplifies the process for manufacturing the rechargeable battery. Additionally, according to one or more embodiments of the present disclosure, the number of constituent elements of the vent unit is reduced, thereby reducing the production cost of the rechargeable battery.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a rechargeable battery having a vent unit according to the present disclosure are described with reference to the following figures. The same reference numerals are used throughout the figures to reference like features and components. The figures are not necessarily drawn to scale.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Although relative terms such as "outer," "inner," "upper," "lower," "below," and "above," and similar terms have been used herein to describe a spatial relationship of one element to another, it is understood that these terms are intended to encompass different orientations of the various elements and components of the device in addition to the orientation depicted in the figures.

Figure 1:
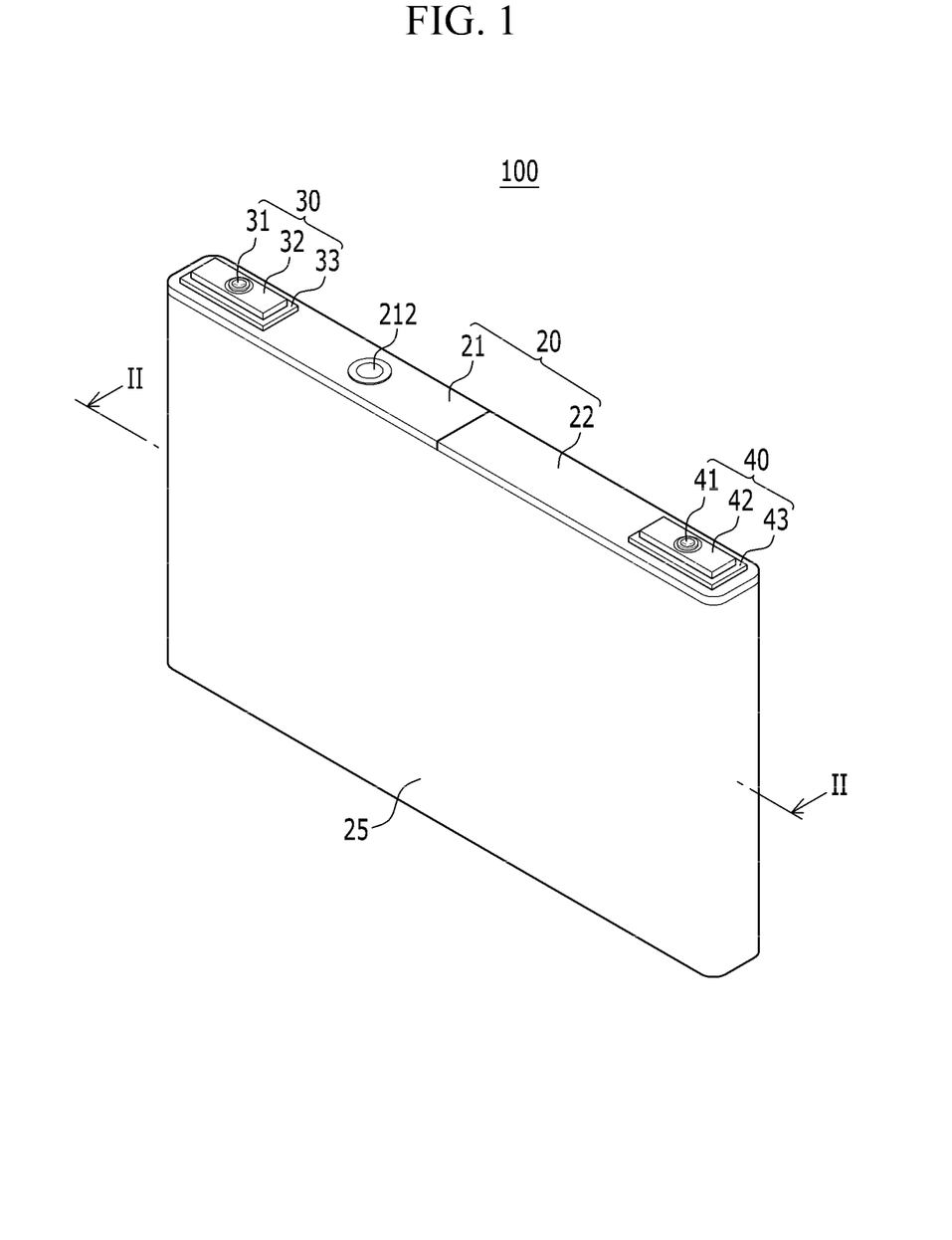
FIG. 1 shows a perspective view of a rechargeable battery according to a first example embodiment of the present invention.
Figure 2:
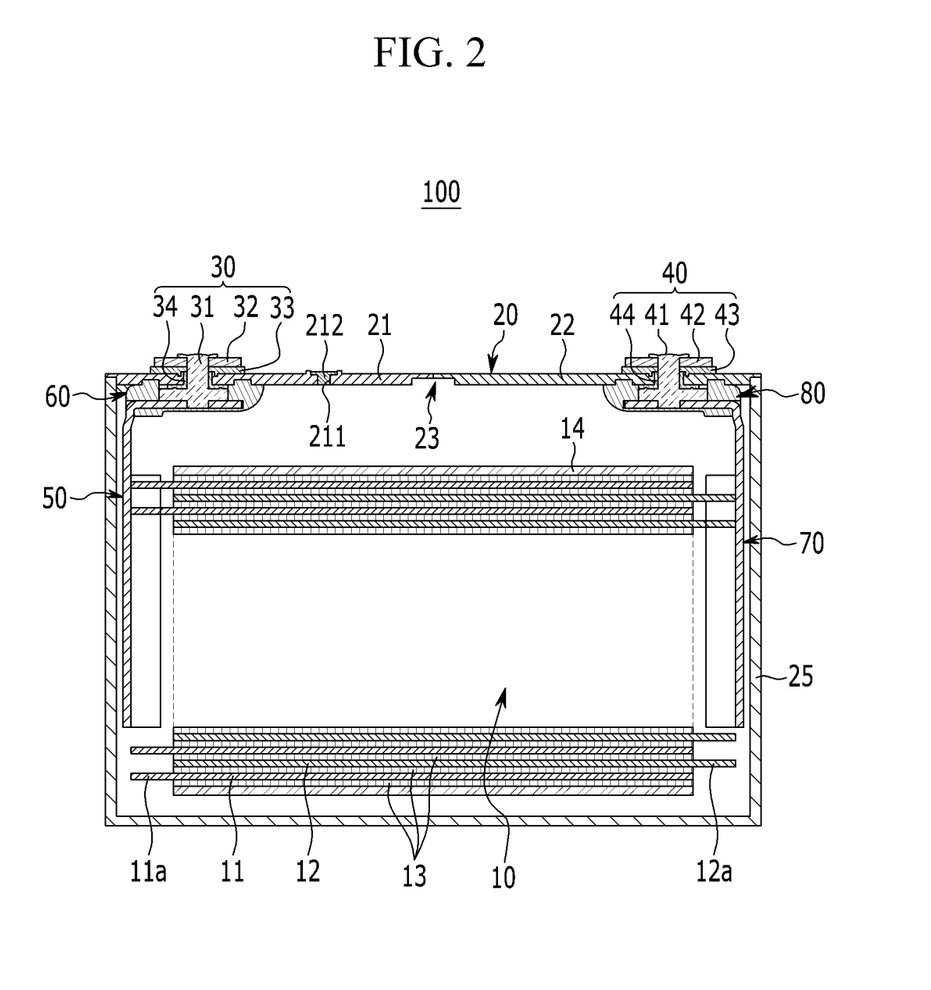
FIG. 2 shows a cross-sectional view of the rechargeable battery of FIG. 1 taken along the line II-II.
Figure 3:
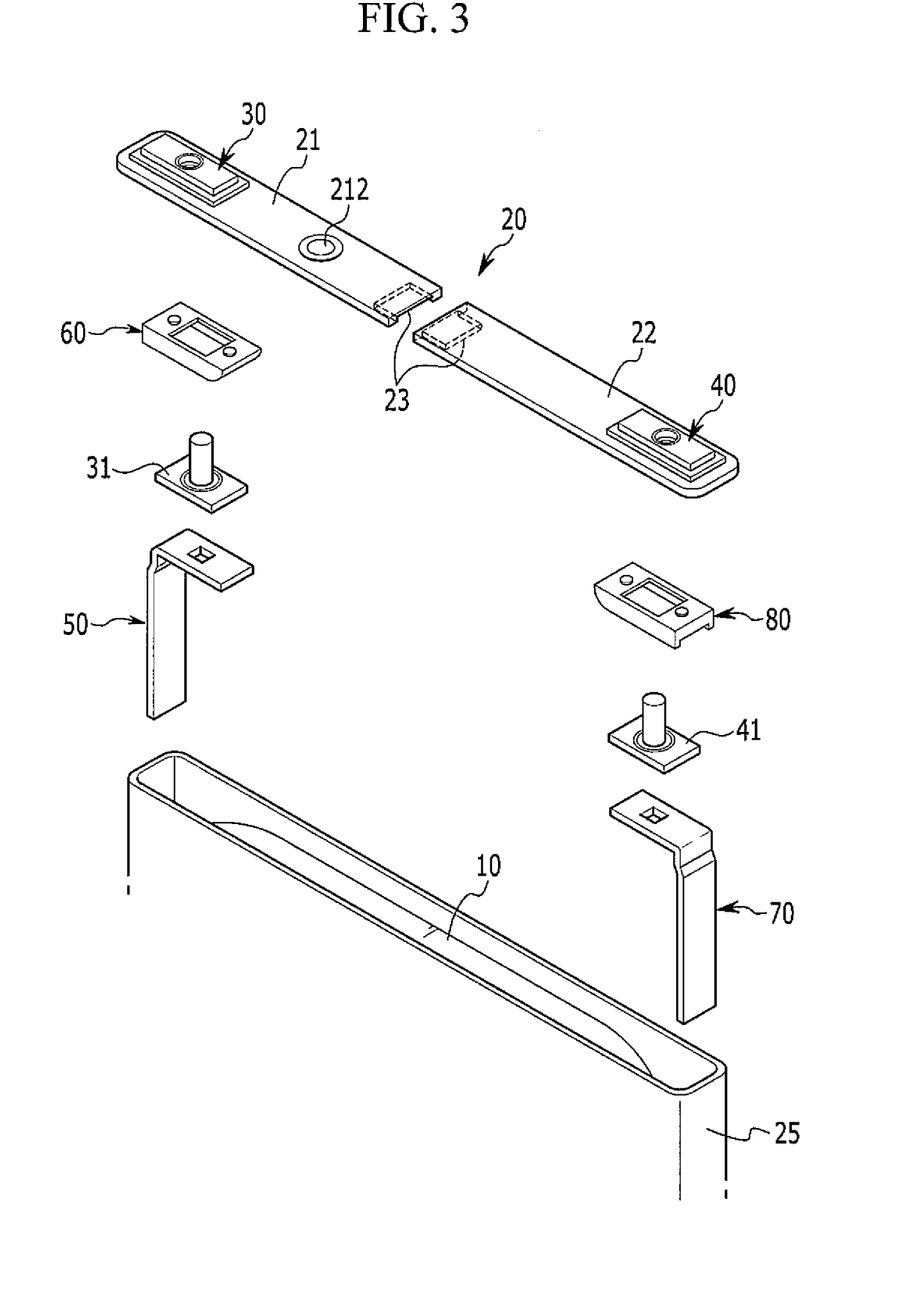
FIG. 3 shows an exploded perspective view of the rechargeable battery according to the first example embodiment of the present invention.

FIG. 1 shows a perspective view of a rechargeable battery according to a first example embodiment of the present invention, FIG. 2 shows a cross-sectional view of the rechargeable battery of FIG. 1 taken along the line and FIG. 3 shows an exploded perspective view of the rechargeable battery according to the first example embodiment of the present invention.

Referring now to the embodiment illustrated in FIG. 1 and FIG. 2, the rechargeable battery 100 includes an electrode assembly 10, a case 25 in which the electrode assembly 10 is installed, a first terminal 30 and a second terminal 40 electrically connected to the electrode assembly 10, a cap plate 20, a first bottom insulating member 60, and a second bottom insulating member 80. The first and second bottom insulating members 60 and 80 are provided near the cap plate 20 and are installed inside the case 25.

Although the rechargeable battery 100 in the illustrated embodiment is a prismatic lithium ion secondary battery, the present invention is not restricted thereto, and, in one or more alternate embodiments, the rechargeable battery 100 may be any other suitable type of rechargeable battery, such as, for instance, a lithium polymer battery, and may have any other suitable shape, such as, for instance, cylindrical.

The electrode assembly 10 is formed as a jellyroll by spirally winding a first electrode 11, a second electrode 12, and a separator 13 disposed between the first and second electrodes 11, 12.

An insulation tape 14 is wound around an outer surface of the electrode assembly 10 to thus insulate the electrode assembly 10 from the case 25.

In the illustrated embodiment, the first electrode 11 is a negative electrode and the second electrode 12 is a positive electrode. However, in an alternate embodiment, the first electrode 11 may be a positive electrode and the second electrode 12 may be a negative electrode.

The first electrode 11 and the second electrode 12 are each divided into a coated region and an uncoated region 11a, 12a, respectively. The coated regions of the electrodes 11, 12 are generated by coating an active material on a current collector. The first electrode uncoated region 11a and the second electrode uncoated region 12a are disposed on respective, opposite sides of the coated region. The uncoated regions are formed while in the jellyroll state by not coating the active material on those portions of the current collector.

The first terminal 30 is electrically connected to the first electrode uncoated region 11a of the electrode assembly 10 by a first electrode current collecting member 50. The second terminal 40 is electrically connected to the second electrode uncoated region 12a by a second electrode current collecting member 70.

In the illustrated embodiment of FIGS. 1 and 2, the first terminal 30 includes a first rivet 31, a first terminal plate 32, a first terminal insulating member 33 provided between the first terminal plate 32 and the cap plate 20, and a first gasket 34. The second terminal 40 includes a second rivet 41, a second terminal plate 42, a second connecting plate 43 provided between the second terminal plate 42 and the cap plate 20, and a second gasket 44.

In the illustrated embodiment of FIGS. 1 and 2, the case 25 has a rectangular parallelepiped shape, although the case 25 may have any other suitable shape, such as, for instance, cylindrical and still fall within the scope and spirit of the present invention. The case 25 may be formed from any suitable material (e.g., a suitable conductive material). The case 25 includes an upper opening configured to receive the electrode assembly 10 (i.e., an upper opening is formed in the first side of the case through which the electrode assembly 10 is inserted).

Referring now to the embodiment illustrated in FIG. 3, the cap plate 20 includes a first plate 21 coupled to a second plate 22. The first plate 21 may be coupled to the second plate by any suitable method, such as, for instance, laser welding. Together, the first and second plates 21, 22 cover the upper opening of the case 25. In the illustrated embodiment, the first plate 21 is co-planar with the second plate 22. The first and second plates 21, 22 each have an outer end and an inner end opposite the outer end and a length extending from the outer end to the inner end. In particular, the inner end of the first plate 21 is connected to the inner end of the second plate 22 to close and seal the upper opening of the case 25 after the electrode assembly 10 has been inserted into the case 25. In the illustrated embodiment, the cap plate 20 is a thin plate, although the cap plate 20 may have any other suitable shape. Additionally, the cap plate 20 may be made out of any suitable conductive material.

The second terminal 40 is installed on the second plate 22. The second plate 22 is electrically connected to the second electrode 12 via the second terminal plate 42, the second connecting plate 43, which may be made of any suitable conductive material, the second rivet 41, and the second electrode current collecting member 70. Additionally, the case 25 is electrically connected to the second electrode 12 via the second plate 22 of the cap plate 20.

In the illustrated embodiment of FIGS. 1 and 2, the first plate 21 includes an electrolyte injection opening 211 for injecting an electrolyte solution into the closed and sealed case 25. In an alternate embodiment, the electrolyte injection opening 211 may be provided in the second plate 22. After the electrolyte solution is injected into the case 25, the electrolyte injection opening 211 may be sealed by a sealing cap 212. In one embodiment, the first terminal 30 is then installed subsequent to the installation of the sealing cap 212. In an alternate embodiment, the first terminal 30 may be installed before the sealing cap 212 is installed in the electrolyte injection opening 211.

With reference now to the embodiment illustrated in FIG. 4, the cap plate 20 according to the first embodiment of the present disclosure will be described in more detail. In the illustrated embodiment, a vent unit 23 is located at a joint along which the first plate 21 is connected to the second plate 22. The vent unit includes a recess or a groove 231 in at least one of the first plate 21 or the second plate 22. Additionally, the vent unit 23 includes at least one notch 232 in the groove 231.

Figure 4:
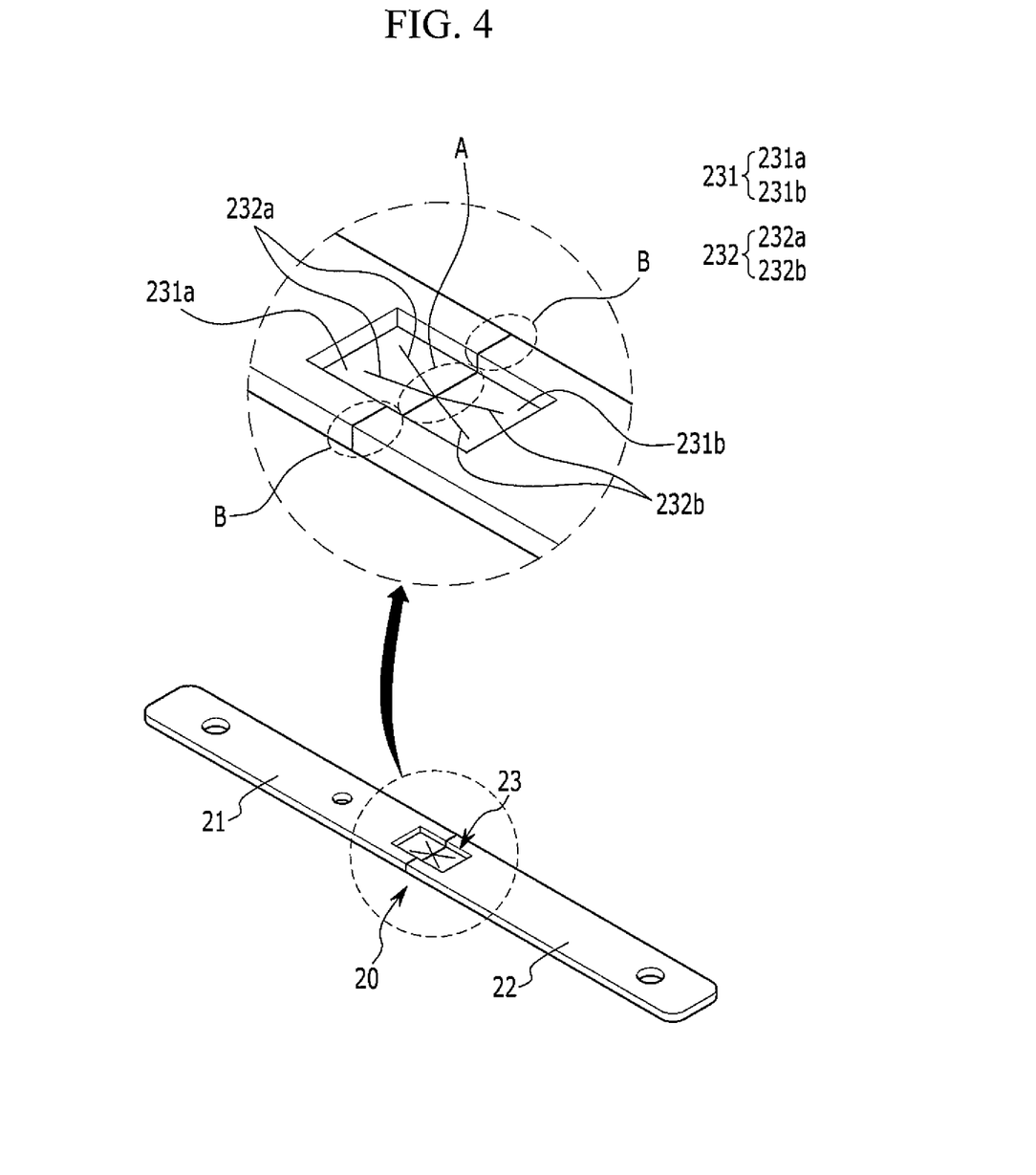
FIG. 4 shows a perspective view of a cap plate according to the first example embodiment of the present invention.

In the embodiment illustrated in FIG. 4, the groove 231 includes a first groove 231a defined in the inner end of the first plate 21 and a second grooves 231b defined in the inner end of the second plate 22. In the illustrated embodiment, the first and second grooves 231a, 231b are rectangular, although in an alternate embodiment the first and second grooves 231a, 231b may have any other suitable shapes, such as, for instance, semi-circular.

Additionally, as shown in FIG. 4, the notch 232 includes a first notch 232a in the first groove 231a, located at the inner end of the first plate 21, and a second notch 232b in the second groove 231b, located at the inner end of the second plate 22. In the illustrated embodiment, the first and second notches 232a, 232b are V-shaped. Accordingly, in the illustrated embodiment, when the first plate 21 is connected to the second plate 22, the first and second notches 232a, 232b define an X-shaped notch 232. However, in one or more alternate embodiments, the first and second notches 232a, 232b may have any other suitable shapes.

When the first plate 21 is connected to the second plate 22, such as by laser welding, the first groove 231a is connected to the second groove 231b and the first notch 232a is connected to the second notch 232b, thereby forming the vent unit 23.

With continued reference to FIG. 4, the joint along which the first and second plates 21, 22 are coupled together includes a first portion (A) and a second portion (B). The first portion (A) includes the part of the first and second plates 21, 22 where the first groove 231a is joined to the second groove 231b. The second portion (B) includes the parts of the joint where the first and second grooves 231a, 231b are not provided. In the illustrated embodiment, the second portion (B) of the joint is provided on opposite sides of the first portion (A). Additionally, because the first and second notches 232a, 232b are located in the first and second grooves 231a, 231b, respectively, the first and second notches 232a, 232b are located in the first portion (A) of the joint.

Further, in the illustrated embodiment, the first and second grooves 231a, 231b are narrower than the first and second plates 21, 22, respectively, such that the first portion (A) is thinner than the second portion (B) (i.e., the cap plate 20 is thinner along the first portion (A) than the second portion (B) of the joint). Accordingly, since the first portion (A) of the joint is thinner than the second portion (B) of the joint, the connection between the first and second plates 21, 22, such as by welding, is weaker along the first portion (A) than along the second portion (B) of the joint between the first and second plates 21, 22. Additionally, the first portion (A) of the joint is weaker where the narrower portions of the first and second notches 232a, 232b meet than along the remainder of the first portion (A) where the first and second notches 232a, 232b do not meet. Accordingly, the first notch 232a and the second notch 232b are configured to rupture or break, thereby discharging the gas generated inside the case 25, when the pressure inside the case 25 becomes greater than a predetermined pressure, such as when the rechargeable battery 100 is charged or discharged with a current that exceeds the current rating of the rechargeable battery 100 (i.e., a part of the first portion (A) of the joint where the narrower portion of the first notch 232a meets the narrower portion of the second notch 232b may be ruptured or broken together along with the first notch 232a and the second notch 232b).

As illustrated in the embodiment of FIG. 2, the vent unit 23 can be formed such that the groove 231 and the notch 232 of the vent unit 23 face the electrode assembly 10 received in the case 25 (i.e., the groove 231 and the notch 232 may be formed on a lower, inner side of the cap plate 20). In this illustrated, since the vent unit 23 is provided facing the inside of the case 25, the vent unit 23 is configured not to rupture or break due to external impacts and the vent unit 23 can react quickly to a change in the internal pressure of the case.

However, the present invention is not limited to a configuration in which the vent unit 23 faces the electrode assembly 10 inside the case 25. In one or more alternate embodiments, the groove 231 and the notch 232 of the vent unit 23 may be exposed outside the case 25 (i.e., the groove 231 and the notch 232 of the vent unit 23 may be formed on an upper, outer side of the cap plate 20 such that the vent unit 23 faces away from the electrode assembly 10 received in the case 25).

Since the vent unit 23 is formed as part of the first plate 21 and the second plate 22 of the cap plate 20, as opposed to a separate component attached to the cap plate 20, the process for forming the vent unit 23 is simplified, which simplifies the entire process for manufacturing the rechargeable battery 100. Additionally, the number of constituent elements of the vent unit 23 is reduced, thereby reducing the production cost of the rechargeable battery 100.

Figure 5:
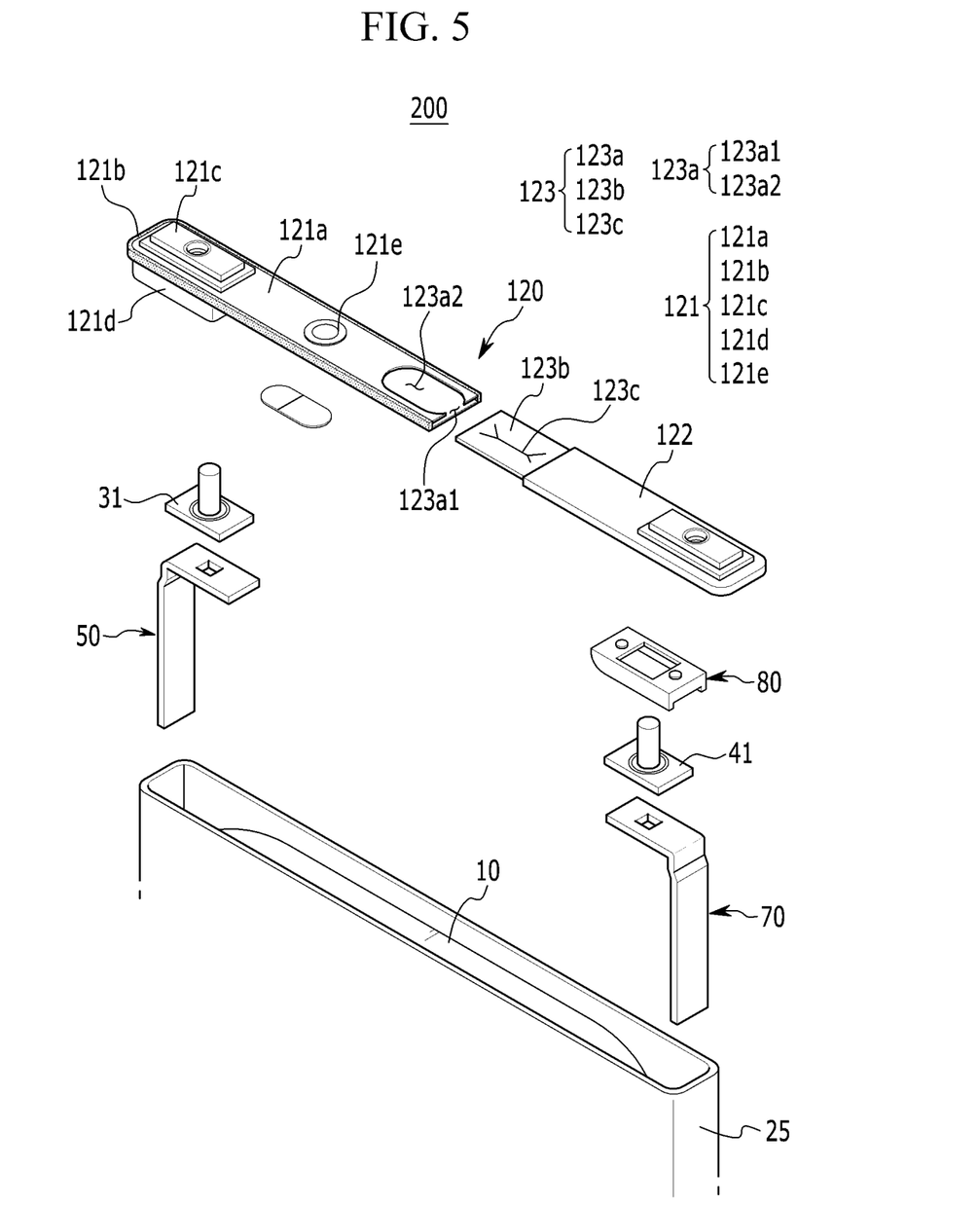
FIG. 5 shows an exploded perspective view of a rechargeable battery according to a second example embodiment of the present invention.
Figure 6:
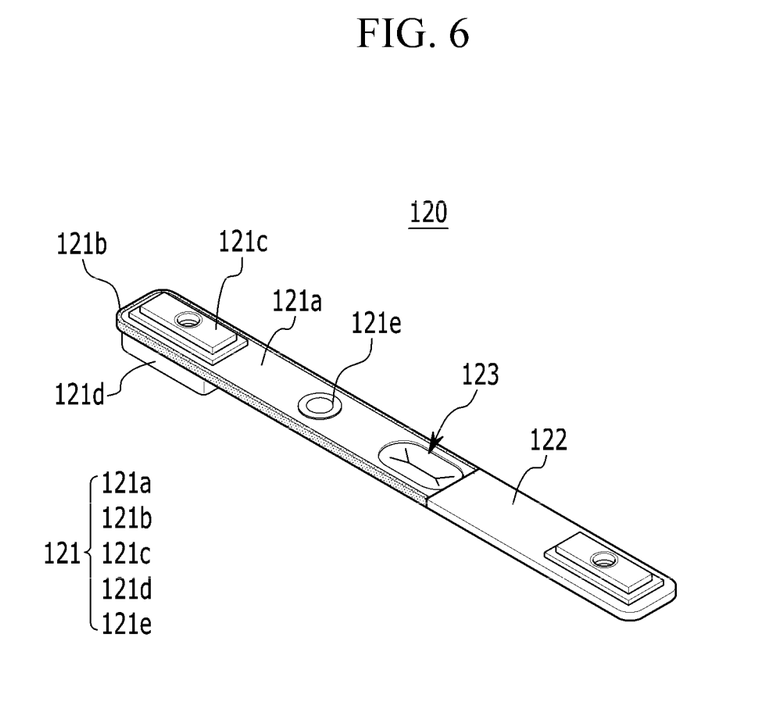
FIG. 6 shows a perspective view of a cap plate according to the second example embodiment of the present invention.

FIG. 5 shows an exploded perspective view of a rechargeable battery 200 according to a second example embodiment of the present invention, and FIG. 6 shows a perspective view of a cap plate 120 according to a second example embodiment of the present invention.

Referring to FIG. 5 and FIG. 6, the rechargeable battery 200 has substantially the same components and configuration as the rechargeable battery 100 according to the first example embodiment of the present invention, except that the cap plate 120 of the second example embodiment differs from the cap plate 20 of the first example embodiment.

Therefore, a detailed description of the same components and configurations as in the rechargeable battery 100 according to the first example embodiment of the present invention will be omitted to avoid duplicity. Instead, the description below will be limited to the cap plate 120.

As shown in FIG. 5 and FIG. 6, the cap plate 120 includes a first plate 121 and a second plate 122 coupled to the first plate 121. The second plate 122 is electrically connected to the second electrode 12.

The first plate 121 includes a first plate body 121a made of an insulation material and electrically connected to the first electrode 11 and the second electrode 12, a connection unit 121b, a first terminal 121c, a bottom insulator 121d, and an electrolyte solution inlet 121e. In an alternate embodiment, the electrolyte solution inlet 121e may be provided on the second plate 122.

The connection unit 121b is connected around a periphery of the first plate body 121a. Additionally, the connection unit 121b is configured to be connected to the upper opening of the case 25 by any suitable method, such as, for instance, by welding.

In one embodiment, the connection unit 121b is formed with the same or similar metal material as the second plate 122, and an inner end of the connection unit 121b may be connected to an inner end of the second plate 122 by any suitable method, such as, for instance, by welding.

Additionally, in one embodiment, the first plate body 121a, the connection unit 121b, the first terminal 121c, and the bottom insulator 121d may be molded and integrally formed, thereby simplifying the process for manufacturing and assembling the rechargeable battery 200.

With continued reference to the embodiment illustrated in FIGS. 5 and 6, a vent unit 123 is located at a joint along which the first plate 121 is connected to the second plate 122. In the illustrated embodiment, the vent unit 123 includes a channel or a groove 123*a* formed at an inner end of the first plate 121, a tab or protrusion 123*b* projecting inward from the inner end of the second plate 122, and a notch 123*c* in the protrusion 123*b*.

The groove 123*a* formed in the first plate 121 includes an inset portion 123*a*1 into which the protrusion 123*b* on the second plate 122 is inserted. The groove 123*a* also includes an opening 123*a*2 extending from the inset portion 123*a*1 up through an upper surface of the first plate 121. When the first and second plates 121, 122 are coupled together, such that the protrusion 123*b* on the second plate 122 is received in the inset portion 123*a*1 of the first plate 121, the opening 123*a*2 reveals or exposes the notch 123*c* formed in the protrusion 123*b* of the second plate 122 (i.e., when the first and second plates 121, 122 are coupled together by inserting the protrusion 123*b* into the inset portion 123*a*1, the notch 123*c* underlies the opening 123*a*2 such that the notch 123*c* is revealed or exposed outside of the case 25).

However, the present invention is not limited to a configuration in which the notch 123*c* of the vent unit 123 is formed and exposed outside the case 25. In one or more alternate embodiments, the opening 123*a*2 and the notch 123*c* may be configured such that when the first plate 121 is connected to the second plate 122, the notch 123*c* faces the electrode assembly 10 received inside the case 25.

Therefore, since the vent unit 123 is formed as part of the first plate 121 and the second plate 122 of the cap plate 120, as opposed to a separate component attached to the cap plate 20, the process for forming the vent unit 123 is simplified, which to simplifies the entire process for manufacturing the rechargeable battery 200. Additionally, the number of constituent elements of the vent unit 123 is reduced, thereby reducing the production cost of the rechargeable battery 200.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
  an electrode assembly including a first electrode, a second electrode, and a separator between the first electrode and the second electrode;
  a case accommodating the electrode assembly;
  a cap plate including a first plate and a second plate coupled to the first plate, the first plate being co-planar with the second plate, the first plate having a length extending between an outer end and an inner end of the first plate, the second plate having a length extending between an inner end and an outer end of the second plate, the inner end of the first plate coupled to the inner end of the second plate along a joint, the cap plate being coupled to an opening of the case; and
    a vent unit at the joint where the first plate of the cap plate is coupled to the second plate,
  wherein the first plate comprises:
    a first plate body comprising an insulation material;
    a connection unit coupled to the first plate body and the opening of the case;
    a first terminal coupled to a first side of the first plate body; and
    a bottom insulator coupled to a second side of the first plate body facing the electrode assembly.

2. The rechargeable battery of claim 1, wherein the vent unit includes a notch in at least one of the first plate or the second plate.

3. The rechargeable battery of claim 2, wherein the vent unit further includes a groove at at least one of the first plate or the second plate, and the notch is in the groove.

4. The rechargeable battery of claim 3, wherein:
  the groove includes a first groove in the first plate and a second groove in the second plate, wherein the first groove is coupled to the second groove, and
  the notch includes a first notch in the first groove and a second notch in the second groove, wherein the first notch is coupled to the second notch.

5. The rechargeable battery of claim 3, wherein the vent unit is at a first side of the cap plate facing the electrode assembly.

6. A rechargeable battery comprising:
  an electrode assembly including a first electrode, a second electrode, and a separator between the first electrode and the second electrode;
  a case accommodating the electrode assembly;
  a cap plate including a first plate and a second plate coupled to the first plate along a joint, the cap plate being coupled to an opening of the case; and
  a vent unit at the joint where the first plate of the cap plate is coupled to the second plate,
    wherein the vent unit includes a notch in at least one of the first plate or the second plate,
    wherein the vent unit further includes a groove at at least one of the first plate or the second plate, and the notch is in the groove, and
  wherein the first plate comprises:
    a first plate body comprising an insulation material;
    a connection unit coupled to the first plate body and the opening of the case;
    a first terminal coupled to a first side of the first plate body; and
    a bottom insulator coupled to a second side of the first plate body facing the electrode assembly.

7. The rechargeable battery of claim 6, wherein the first plate body, the connection unit, the first terminal, and the bottom insulator are molded and integrally formed.

8. The rechargeable battery of claim 6, wherein
  the connection unit comprises a same metal material as the second plate, and
  the connection unit is coupled to the second plate through welding.

9. The rechargeable battery of claim 6, wherein the groove is in the first plate body.

10. The rechargeable battery of claim 9, wherein:
  the vent unit further includes a protrusion protruding from the second plate, and
  the notch is in the protrusion.

11. The rechargeable battery of claim 10, wherein the groove includes an inset portion into which the protrusion is inserted, and an opening exposing the notch.

* * * * *